United States Patent
Buckhouse et al.

(10) Patent No.: US 7,111,375 B2
(45) Date of Patent: Sep. 26, 2006

(54) FOOTPEG FOR A MOTORCYCLE

(75) Inventors: Eric R. Buckhouse, Racine, WI (US);
Brian T. Nelson, Racine, WI (US);
Kurt C. Nelson, Gilbert, AZ (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 379 days.

(21) Appl. No.: 10/411,473

(22) Filed: Apr. 10, 2003

(65) Prior Publication Data
US 2004/0200312 A1   Oct. 14, 2004

(51) Int. Cl.
*G05G 1/18*   (2006.01)
*B21D 39/03*  (2006.01)

(52) U.S. Cl. .................. 29/428; 29/525.11; 74/564; 296/75; 280/291

(58) Field of Classification Search ................ 74/564; 280/291; 29/434, 428, 525.11; 296/75; G05G 1/18
See application file for complete search history.

(56) References Cited

U.S. PATENT DOCUMENTS

| 5,482,307 | A | * | 1/1996 | Lin .......................... 280/291 |
| 5,524,918 | A | * | 6/1996 | Peabody et al. ............ 280/291 |
| 6,070,897 | A | * | 6/2000 | Hsieh et al. ................ 280/291 |
| 6,161,859 | A | * | 12/2000 | Cheng ....................... 280/291 |
| 6,499,378 | B1 | * | 12/2002 | Ho ............................. 74/564 |
| 6,663,129 | B1 | * | 12/2003 | Smith ........................ 280/291 |
| 6,916,034 | B1 | * | 7/2005 | Elliott ....................... 280/291 |
| 2004/0074334 | A1 | * | 4/2004 | Khiev ........................ 74/564 |

OTHER PUBLICATIONS

V-TWIN, 1993 Uniquely V-Twin Manufacturing Catalog, pp. 227-233, published prior to Jan. 1, 1994.
Harley-Davidson, 1993/94 Sportster Five-Speed/Belt Drive Parts Catalog—All Models, Part No. 99451-94, p. 66, published prior to Jan. 1, 1994.
Harley-Davidson, 1994 Harley-Davidson Genuine Parts & Accessories Catalog, pp. 13 and 102, published prior to Jan. 1, 1995.
Custom Chrome, 94 Custom Chrome Catalog, pp. 93-94, and various non-numbered pages, published prior to Jan. 1, 1995.
Harley-Davidson, 1996 Harley-Davidson Genuine Motor Accessories and Genuine Motor Parts Catalog, General, pp. 142-145, published prior to Jan. 1, 1996.
J&P Cycles, 1997 Parts and Accessories for Your Harley-Davidson Catalog, pp. 12-4 through 12-13, published prior to Jan. 1, 1997.

* cited by examiner

*Primary Examiner*—Vinh T. Luong
(74) *Attorney, Agent, or Firm*—Michael Best & Friedrich LLP

(57) ABSTRACT

A motorcycle footpeg assembly comprising a footpeg mount having a first portion and a second portion. The first portion is adapted to attach to a motorcycle. The footpeg assembly also includes a footpeg coupled to the second portion with a fastener such that the fastener is not visible from the exterior of the footpeg.

7 Claims, 3 Drawing Sheets

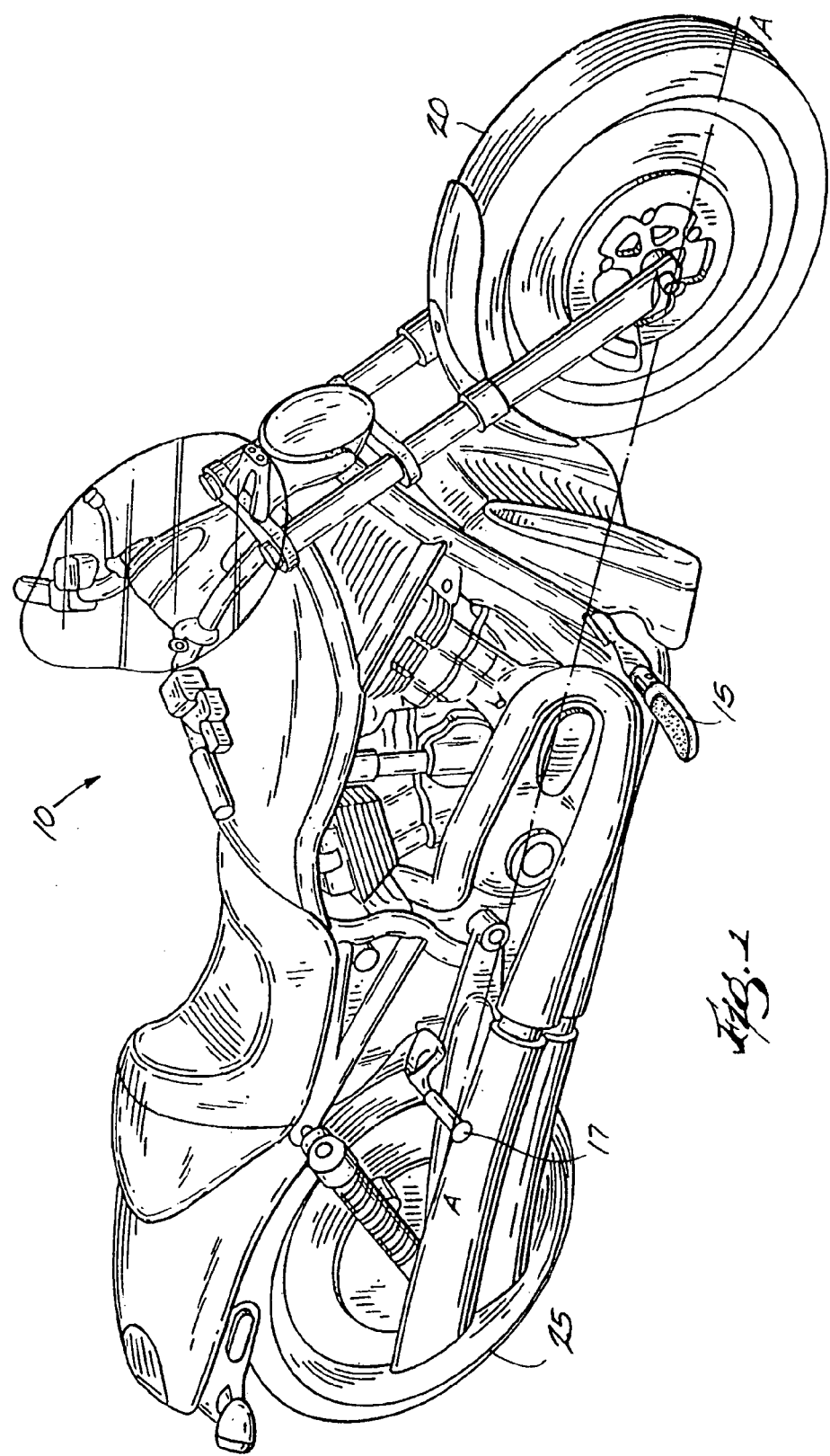

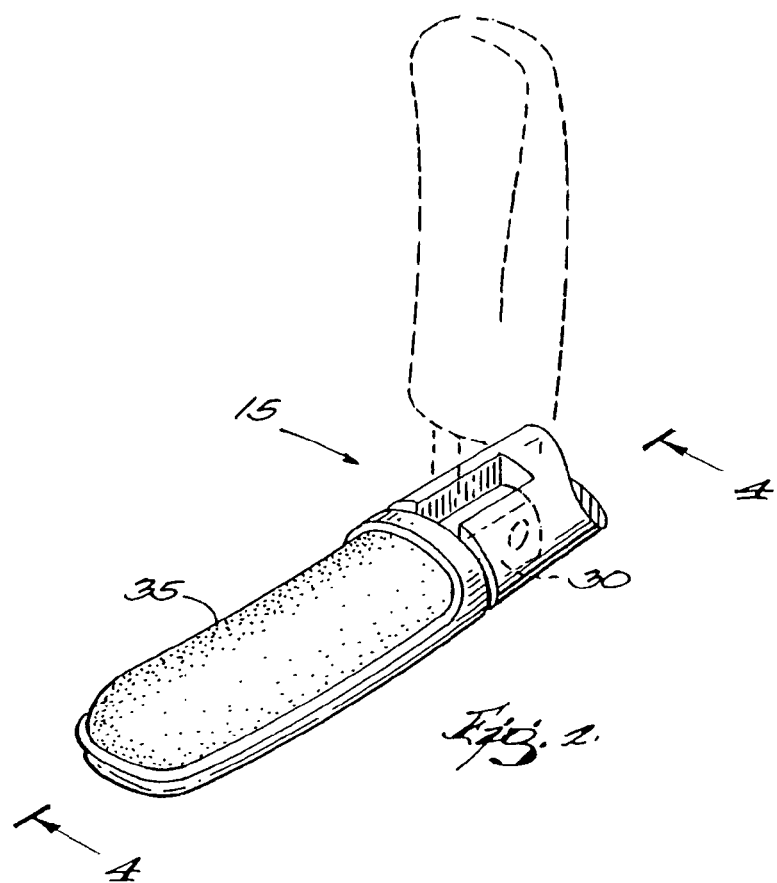
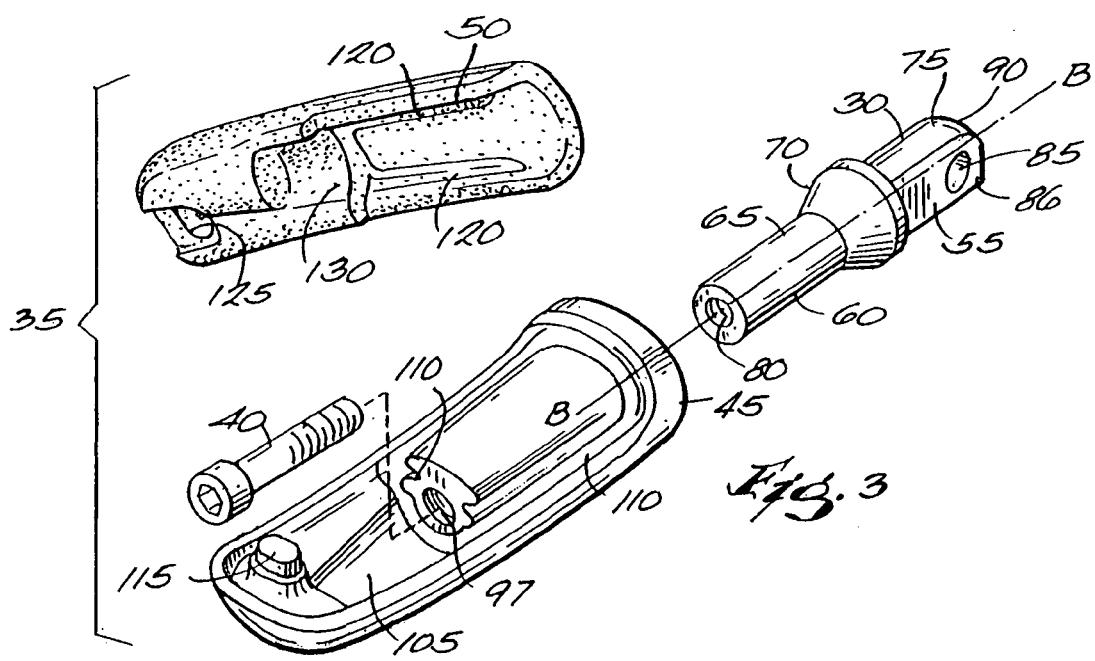

FOOTPEG FOR A MOTORCYCLE

BACKGROUND OF THE INVENTION

The present invention generally relates to motorcycles, and particularly to footpegs used to support the feet of the motorcycle rider and/or the motorcycle passenger.

Motorcycles generally include a pair of footpegs that extend laterally away from the motorcycle. The footpegs provide a convenient footrest for the rider. In addition, many motorcycles provide an additional pair of footpegs similar to the first pair for use by a passenger.

Generally, the footpeg is formed from a single piece and is attached to the motorcycle frame using a fastener such as a bolt or clamp. The footpeg commonly pivots between retracted and extended positions. Other footpegs may include a footpeg mount that attaches to the frame of the motorcycle. A footpeg attaches to the footpeg support using a bolt or other fastener that is visible on the exterior of the footpeg. It is also common for footpegs to include a rubber portion that dampens vibrations from the motorcycle to the rider and provides a high friction surface to support the foot of the rider. The rubber portion is commonly glued, bolted, or molded onto the more rigid footpeg.

SUMMARY OF THE PREFERRED EMBODIMENT

The present invention provides a motorcycle footpeg assembly that is mounted to a motorcycle using a fastener that is hidden from view. The assembly includes a footpeg mount having a first portion and a second portion. The first portion is adapted to attach to a motorcycle. The footpeg assembly also includes a footpeg coupled to the second portion with a fastener that is not visible from the exterior of the footpeg. By virtue of this design, the aesthetics of the footpeg are improved.

The present invention also provides a motorcycle footpeg assembly that can be adjusted. The footpeg assembly includes a footpeg mount. The footpeg mount includes a first portion, a second portion, and a longitudinal axis. The first portion is rotatable relative to the second portion such that the footpeg is rotatable about the longitudinal axis. By virtue of this feature, the position of the footpeg can be adjusted to make it more comfortable to the rider.

The invention also provides a motorcycle footpeg assembly that can be easily assembled. The assembly includes a base member having an open chamber and a resilient member. The resilient member is slidable onto the base member to secure the resilient member to the base member.

BRIEF DESCRIPTION OF THE DRAWINGS

The detailed description particularly refers to the accompanying figures in which:

FIG. 1 is a perspective view of a motorcycle including a footpeg assembly embodying the present invention;

FIG. 2 is an enlarged perspective view of the footpeg assembly of FIG. 1;

FIG. 3 is an exploded view of the footpeg assembly of FIG. 2;

Figure 4:
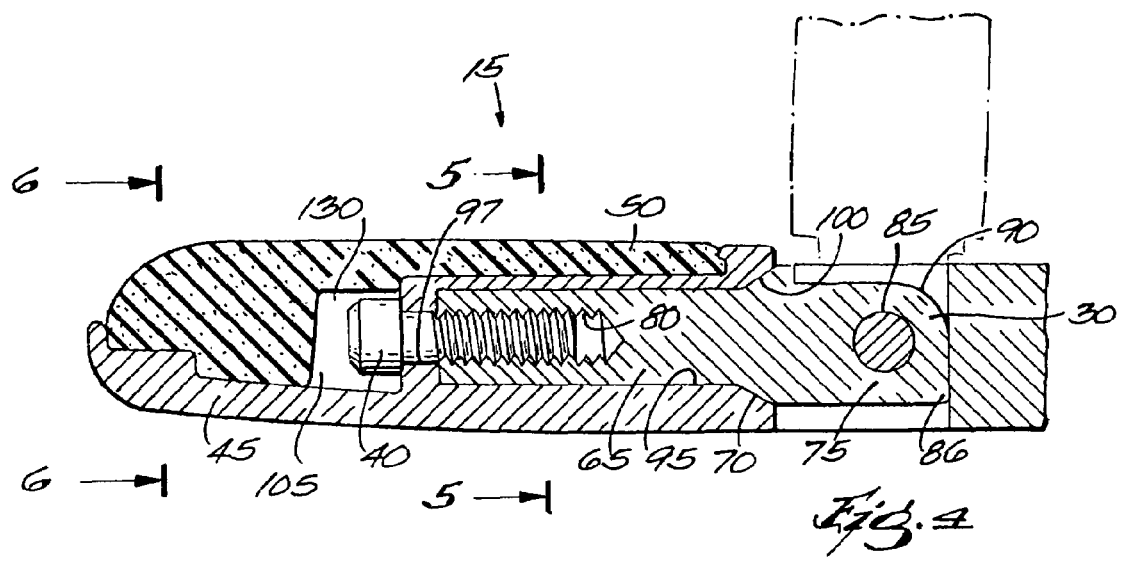
FIG. 4 is a section view of the footpeg assembly taken along line 4—4 of FIG. 2.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION OF THE DRAWINGS

FIG. 1 illustrates a motorcycle 10 including a first set of footpeg assemblies 15 and a second set of footpeg assemblies 17. The motorcycle 10 defines a longitudinal axis A—A that extends along the length of the motorcycle from the center of a front tire 20 to the center of a rear tire 25. The footpeg assemblies 15 extend laterally from the motorcycle 10 and are generally perpendicular to the longitudinal axis A—A when in an extended position. As is best illustrated in FIG. 2, the footpeg assemblies 15 may be pivotable from the extended position (solid lines) to a retracted position (broken lines). Generally, it is preferred that the footpeg assemblies 15 pivot up to a substantially vertical position.

Returning to FIG. 1, the position of the first pair of footpeg assemblies 15 allows a rider to position his or her feet on the footpeg assemblies 15 while operating the motorcycle 10. The position of the second pair of footpeg assemblies 17 allows a passenger to rest his or her feet on the footpeg assemblies 17 while riding. In addition to the footpeg assemblies 15 shown, other motorcycle constructions may include additional pairs of footpeg assemblies 15 positioned to allow the rider or passenger alternate locations for their feet. The alternate locations allow the rider or passenger to reposition their legs and feet during long rides, thus improving their comfort.

With reference to FIG. 3, the footpeg assembly 15 includes a footpeg mount 30, a footpeg 35, and a fastener such as a bolt 40. The footpeg 35 includes a first member such as a footpeg body 45 and a second member such as a footpeg cover 50. The footpeg mount 30 includes a first portion 55 that attaches to the motorcycle 10 using a bolt or pin (not shown). The footpeg mount 30 also includes a second portion 60 that connects to the footpeg 35 using the bolt 40. The footpeg assembly 15 is pivotable between the retracted and extended position about the bolt or pin that attaches the footpeg mount 30 to the motorcycle 10 as illustrated in FIG. 2.

The footpeg mount 30, best illustrated in FIG. 3, includes a cylindrical portion 65, a frustoconical portion 70, and an attachment portion 75. The cylindrical portion 65 includes a threaded bore 80 extending along a longitudinal axis B—B defined by the cylindrical portion 65. The cylindrical portion 65 receives and supports the footpeg body 45 such that the body 45 can rotate about the longitudinal axis B—B of the footpeg mount 30. The frustoconical portion 70 engages the footpeg body 45 and provides a stop to position the footpeg body 45 in the desired position along the longitudinal axis B—B.

The attachment portion 75 of the footpeg mount 30 is a rectangular boss that includes a bore 85 that is substantially perpendicular to the longitudinal axis B—B of the cylindrical portion 65 and substantially parallel to the longitudinal axis A—A of the motorcycle 10. The bore 85 receives a pin or bolt that attaches the footpeg assembly 15 to the motorcycle 10 and facilitates movement of the footpeg assembly 15 between the retracted and extended position. One of the corners 90 of the attachment portion 75 adjacent the motorcycle 10 may be rounded to facilitate the desired pivoting motion of the footpeg assembly 15, and the other corner includes a stop 86 (shown in FIG. 4) that prevents the footpeg assembly 15 from rotating beyond the substantially horizontal position illustrated in FIG. 2.

With continued reference to FIG. 3, the footpeg body 45 includes a cylindrical bore 95 (shown in FIG. 4), a hole 97, a frustoconical bore 100 (shown in FIG. 4), a chamber 105, a sliding attachment portion in the form of engagement grooves 110, and a boss 115. The cylindrical bore 95 receives the cylindrical portion 65 of the footpeg mount 30 such that the footpeg body 45 is rotatable about the longitudinal axis B—B. The frustoconical bore 100 engages the frustoconical portion 70 of the footpeg mount 30 to properly position the footpeg 35, while still allowing for rotation about the longitudinal axis B—B of the footpeg mount 30.

The chamber 105 provides an empty space that receives at least a portion of the bolt 40. The bolt 40 is inserted through the hole 97 and threads into the threaded bore 80 of the footpeg mount 30 to attach the footpeg mount 30 to the footpeg body 45. The bolt 40 can be loosened to allow for rotation of the footpeg body 45 about the longitudinal axis B—B of the footpeg mount 30. After the orientation of the footpeg 15 has been adjusted, the fastener can be tightened to secure the footpeg 15 against rotation.

Still referring to FIG. 3, the footpeg cover 50 includes a sliding attachment portion in the form of engagement ridges 120, a recess 125, and a chamber 130. The chamber 130 cooperates with the chamber 105 of the footpeg body 45 to contain a portion of the bolt 40 and hide it from view. The engagement ridge 120 is shaped to slide into the engagement groove 110 of the footpeg body 45 to attach the two components to one another. Once in the desired position, the boss 115 and recess 125 align with and are engagable with one another. Once the boss 115 and recess 125 are engaged, the footpeg cover's movement relative to the footpeg body 45 is restricted.

In the illustrated construction, the footpeg cover 50 is manufactured from a pliable, resilient material such as rubber. Rubber increases the friction between the rider's shoe or boot and the footpeg assembly 15, thereby reducing the likelihood of the rider's foot slipping off the footpeg assembly 15.

Turning to FIG. 4, the footpeg assembly 15 is shown in its assembled condition. As can be seen, a portion of the bolt 40 is contained within the chambers 105, 130 and is thus hidden from view.

Figure 5:
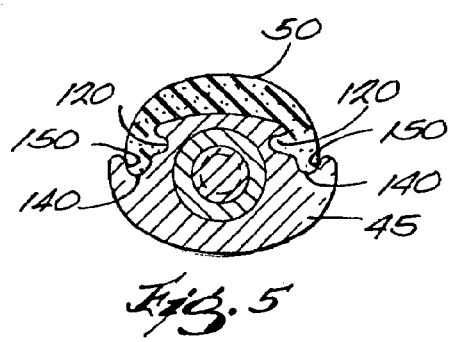
FIG. 5 is a section view of the footpeg assembly taken along line 5—5 of FIG. 4.
Figure 6:
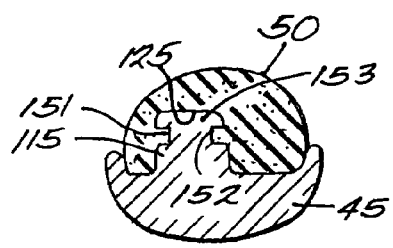
FIG. 6 is a section view of the footpeg assembly taken along line 6—6 of FIG. 4.

With reference to FIGS. 5 and 6, the attachment of the footpeg cover 50 to the footpeg body 45 is better illustrated. The engagement ridge 120 is shown positioned in the engagement groove 110. The footpeg cover 50 further includes two extension members 140 positioned two extension recesses 150 in the footpeg body 45. The footpeg cover 50 is slidable along the longitudinal axis B—B but cannot move in any other direction. The engagement of the extension members 140 with the extension recesses 150 prevent the relatively pliable footpeg cover 50 from deforming to a point that allows for the disengagement of the engagement rides 120 from the engagement grooves 110.

FIG. 6 better illustrates the engagement of the boss 115 and the recess 125. The boss 115 includes a channel 151 or groove circumscribing the boss 115. The recess 125 includes a ridge 152 around a large opening 153 or aperture. The ridge 152 is sized to engage the channel 151 when the boss 115 and recess 125 are engaged. Once the boss 115 engages the recess 125, movement of the footpeg cover 50 relative to the footpeg body 45 is inhibited. It should be understood that the boss 115 and recess 125 could be reversed such that the boss 115 is on the footpeg cover 50 rather than the footpeg body 45. In other constructions, other shaped bosses and recesses may be used. The boss/recess engagement inhibits translational movement of the footpeg cover 50 relative to the footpeg body 40. Furthermore, the boss/recess prevents the end of the footpeg cover 50 from lifting away from the footpeg body 40. One of ordinary skill in the art will realize many other shapes can be used to perform the functions of the boss and recess (e.g., barbed-boss, tapered boss, etc.). Therefore, the invention should not be limited to the specific shapes described herein. In addition, other constructions may use hook and loop fasteners, or adhesives to affix the footpeg cover 50 to the footpeg body 40.

Although the invention has been described in detail with reference to certain preferred embodiments, variations and modifications exist within the scope and spirit of the invention as described and defined in the following claims.

What is claimed is:

1. A method of attaching a footpeg to a motorcycle, the method comprising:
    attaching a first portion of a footpeg mount to the motorcycle;
    coupling a second portion of the footpeg mount to the footpeg using a fastener, the footpeg including a footpeg body that defines a substantially upwardly-opening chamber, the fastener at least partially disposed within the chamber; and
    attaching a footpeg cover to the footpeg body to close the chamber and enclose the fastener within the footpeg.

2. The method of claim 1, further comprising slidably engaging the footpeg cover and the footpeg body.

3. A method of attaching a footpeg to a motorcycle, the method comprising:

attaching a first portion of a footpeg mount to the motorcycle, the footpeg mount defining a longitudinal axis;

coupling a second portion of the footpeg mount to the footpeg using a fastener, the footpeg including a footpeg body that defines an open chamber that receives at least a portion of the fastener;

coupling a resilient footpeg cover to the footpeg body to close the open chamber and enclose the fastener; and rotating the footpeg about the longitudinal axis relative to the footpeg mount.

4. The method of claim 3, further comprising pivotally attaching the footpeg mount to the motorcycle.

5. The method of claim 3, further comprising engaging a first frustoconical portion disposed on the footpeg mount with a second frustoconical portion disposed on the footpeg.

6. The method of claim 3, further comprising tightening the fastener to restrict rotation of the footpeg about the longitudinal axis.

7. A method of attaching a footpeg to a motorcycle, the method comprising:

attaching a first portion of a footpeg mount to the motorcycle;

attaching a footpeg body to the footpeg mount, the footpeg body including a first attachment portion and a second attachment portion integrally-formed as part of the footpeg body;

slidably connecting a first attachment portion that is integrally-formed as part of a footpeg cover to the first attachment portion of the footpeg body; and engaging a second attachment portion that is integrally-formed as part of the footpeg cover with the second attachment portion of the footpeg body to restrict the footpeg cover from sliding relative to the footpeg body.

* * * * *